(12) United States Patent
Demott et al.

(10) Patent No.: US 11,945,745 B2
(45) Date of Patent: Apr. 2, 2024

(54) MINERAL WOOL

(71) Applicant: KNAUF INSULATION SPRL, Vise (BE)

(72) Inventors: Gerard Demott, Majcichov (SK); Mitja Oresnik, Skofja Loka (SI)

(73) Assignee: Knauf Insulation SPRL, Vise (BE)

( * ) Notice: Subject to any disclaimer, the term of this patent is extended or adjusted under 35 U.S.C. 154(b) by 1100 days.

(21) Appl. No.: 16/488,283

(22) PCT Filed: Feb. 23, 2018

(86) PCT No.: PCT/EP2018/054581
§ 371 (c)(1),
(2) Date: Aug. 23, 2019

(87) PCT Pub. No.: WO2018/154077
PCT Pub. Date: Aug. 30, 2018

(65) Prior Publication Data
US 2021/0139369 A1 May 13, 2021

(30) Foreign Application Priority Data
Feb. 24, 2017 (GB) ..................... 1703054

(51) Int. Cl.
*C03C 13/06* (2006.01)
*C03C 3/091* (2006.01)
*C03C 3/118* (2006.01)

(52) U.S. Cl.
CPC .............. *C03C 13/06* (2013.01); *C03C 3/091* (2013.01); *C03C 3/118* (2013.01)

(58) Field of Classification Search
CPC ......... C03C 13/06; C03C 3/091; C03C 3/118; C03C 1/002; C03B 37/02; C03B 37/023
See application file for complete search history.

(56) References Cited

U.S. PATENT DOCUMENTS

| | | | | |
|---|---|---|---|---|
| 6,060,413 A | * | 5/2000 | Bernard | A01G 24/18 501/36 |
| 2004/0014586 A1 | * | 1/2004 | Otaki | C03C 3/085 65/447 |
| 2009/0311936 A1 | * | 12/2009 | Espiard | D04H 1/4218 427/221 |

FOREIGN PATENT DOCUMENTS

| | | | | |
|---|---|---|---|---|
| EP | 0502159 A1 | 9/1992 | | |
| EP | 0918734 A1 | 6/1999 | | |
| EP | 1048625 A1 | * 11/2000 | ............. | C03C 13/00 |
| EP | 1283196 A1 | * 2/2003 | ............. | C03C 13/00 |

\* cited by examiner

*Primary Examiner* — Elizabeth A. Bolden
(74) *Attorney, Agent, or Firm* — Knauf Insulation, Inc.; James K. Blodgett

(57) ABSTRACT

The present disclosure relates to mineral wool compositions and articles, as well as methods for manufacturing mineral wool compositions and articles.

16 Claims, No Drawings

MINERAL WOOL

CROSS-REFERENCE TO RELATED APPLICATIONS

This application is a U.S. national counterpart application of International Application Serial No. PCT/EP2018/054581, filed Feb. 23, 2018, under 35 U.S.C. § 371, which claims priority to GB Application Serial No. 1703054.5, filed Feb. 24, 2017, the disclosures of which are hereby incorporated herein by reference.

BACKGROUND OF THE INVENTION

The present disclosure relates to mineral wool compositions and articles, including methods for manufacturing mineral wool compositions and articles.

The manufacturing and commercial requirements for mineral wool fibers include appreciable physical strength, humidity resistance, biosolubility and compatibility with known manufacturing techniques. In addition, the raw materials used for producing the mineral wool fibers must likewise comport with manufacturing techniques, while further being available in ample supply and capable of producing compositional consistency. Raw materials used for the manufacture of stone wool fibers include basalt, gabbro, dolomite, calcined alumina and recycled materials including stone wool fibers and slag, while glass wool fiber raw materials may be selected from silica sand, feldspar, nepheline syenite, aplite, calcined alumina, hydrated alumina, soda ash, limestone, dolomite, magnesite, recycled glass bottles, recycled glass sheets, borax pentahydrate, borax decahydrate and anhydrous borax.

SUMMARY OF THE INVENTION

In some embodiments, the present disclosure provides for methods for producing mineral wool fibers, as well as compositions and articles comprising the same.

In certain embodiments, mineral wool fibers produced in accordance with the present disclosure comprise 55-75 wt. % silicon dioxide ($SiO_2$), 5-20 wt. % of a combination of calcium oxide (CaO) and/or magnesium oxide (MgO), 5-20 wt. % of a combination of sodium oxide ($Na_2O$) and/or potassium oxide ($K_2O$), 0-5 wt. % aluminum oxide ($Al_2O_3$), 0-2 wt. % iron(III) oxide ($Fe_2O_3$), alternatively known as ferric oxide, and an alkali metal(s)/alkaline earth metal(s) ratio, which in certain embodiments comprises a ratio of ($Na_2O+K_2O$)/(CaO+MgO), of greater than 1.

DETAILED DESCRIPTION OF THE INVENTION

As used herein, the term "weight percentage" (wt. %) refers to the concentration percentage by weight of a chemical component.

In some embodiments, the concentration of $SiO_2$ in mineral wool fibers disclosed herein may be greater than or equal to 60 wt. %, including greater than or equal to 62 wt. %, and/or less than or equal to 70 wt. % and less than or equal to 72 wt. %. In certain embodiments, the concentration of $Al_2O_3$ in the disclosed mineral wool fibers may be greater than or equal to 1 wt. %, including greater than or equal to 2 wt. %, and/or less than or equal to 5 wt. % and less than or equal to 7 wt. %. In additional embodiments, the concentration of CaO and/or MgO in the disclosed mineral wool fibers may be greater than or equal to 11 wt. %, greater than or equal to 13 wt. %, and/or less than or equal to 20 wt. % and greater than or equal to 22 wt. %. In further embodiments, the quantity of the alkali metals such as the combination of $Na_2O$ and $K_2O$ in the mineral wool fibers may be greater than or equal to 7 wt. %, greater than or equal to 10 wt. %, and/or less than or equal to 12 wt. % and less than or equal to 15 wt. %. In still further embodiments, the concentration of $Fe_2O_3$ in the mineral wool fibers may be less than or equal to 0.8 wt. % and less than or equal to 1 wt. %. In additional embodiments, the ratio of alkali metal(s)/alkaline earth metal(s), which may be expressed as a concentration of wt. % of the metal oxides, e.g. ($Na_2O+K_2O$)/(CaO+MgO), is greater than 1.

In some embodiments, the disclosed mineral wool fibers are biosoluble in accordance with European Union (EU) Directive 67/548/EEC, Note Q.

In further embodiments, the present disclosures provides for a method of manufacturing mineral wool fibers comprising introducing mineral batch material(s), which may alternatively be referred to as first batch material(s), into a melter such as a submerged combustion melter (SCM), melting the mineral batch material(s) to provide a melt, and fiberizing the melt to form mineral wool fibers.

In some embodiments, mineral batch material(s) for the production of mineral wool fibers of the present disclosure may comprise 1) 52-62 wt. % $SiO_2$, such as 52-56 wt % $SiO_2$; 2) 12-16 wt. % $Al_2O_3$; 3) 16-25 wt. % CaO; 4) 0-5 wt. % MgO; 5) 0-10 wt. % boron oxide ($B_2O_3$), such as 5-10 wt % $B_2O_3$; 6) 0-2 wt. % lithium oxide ($Li_2O$), sodium oxide ($Na_2O$) and/or potassium oxide ($K_2O$); 7) 0-1.5 wt. % titanium dioxide ($TiO_2$); 8) 0.005-1 wt. % $Fe_2O_3$; and 9) 0-1 wt. % fluoride ($F^-$).

In some embodiments, the concentration of $SiO_2$ in mineral batch material(s) may be greater than or equal to 52 wt. %, such as greater than or equal to 54 wt. %, greater than or equal to 55 wt. % and greater than or equal to 56 wt. %, and/or less than or equal to 58 wt. %, less than or equal to 60 wt. % and less than or equal to 61 wt. %. In further embodiments, the concentration of $Al_2O_3$ in a mineral batch material may be greater than or equal to 12.5 wt. % and greater than or equal to 13 wt. %, and less than or equal to 14 wt. % and less than or equal to 15 wt. %. In still further embodiments, the concentration of CaO in a mineral batch material may be greater than or equal to 20 wt. % and greater than or equal to 21 wt. %, and/or less than or equal to 23 wt. % and less than or equal to 24.5 wt. %. In some embodiments, the concentration of MgO in a mineral batch material may be greater than or equal to 0.5 wt. % and greater than or equal to 1 wt. %, and less than or equal to 3 wt. % and less than or equal to 5 wt. %. In further embodiments, the concentration of $Fe_2O_3$ in a mineral batch material may be greater than or equal to 0.001 wt. %, greater than or equal to 0.05 wt. %, greater than or equal to 0.1 wt. %, and/or less than or equal to 0.5 wt. % and less than or equal to 0.6 wt. %. In still further embodiments, the concentration of $B_2O_3$ in a mineral batch material may be greater than or equal to 0.25 wt. %, greater than or equal to 4.5 wt. % and greater than or equal to 5 wt. %, and/or less than or equal to 3.5 wt. %, less than or equal to 7.5 wt. % and less than or equal to 10 wt. %.

In some embodiments, mineral batch material(s) for the production of mineral wool fibers of the present disclosure may comprise 1) 53-56 wt. % $SiO_2$, 2) 12-16 wt. % $Al_2O_3$, 3) 20-24 wt. % CaO, 4) 0-2 wt. % MgO, 5) 4-8 wt. % $B_2O_3$, 6) 0.5-1.8 wt. % of one or more of $Li_2O$, $Na_2O$ and/or $K_2O$, 7) 0-0.5 wt. % $TiO_2$, and 8) 0.005-0.75 wt. % $Fe_2O_3$.

In additional embodiments, mineral batch material(s) for the production of mineral wool fibers of the present disclosure may comprise 1) 55-57 wt. % $SiO_2$, 2) 12-15 wt. % $Al_2O_3$, 3) 23-26 wt. % CaO, 4) 1-4.5 wt. % MgO, 5) 0.01-2.5 wt. % $B_2O_3$, 6) 0.5-1.8 wt. % of one or more of $Li_2O$, $Na_2O$ and/or $K_2O$, 7) 0.01-1.5 wt. % $TiO_2$, and 8) 0.005-0.75 wt. % $Fe_2O_3$.

In further embodiments, mineral batch material(s) for the production of mineral wool fibers of the present disclosure may comprise 1) 58-62 wt. % $SiO_2$, 2) 11.5-14.5 wt. % $Al_2O_3$, 3) 20-24 wt. % CaO, 4) 1.5-5 wt. % MgO, 5) 0.01-2.5 wt. % $B_2O_3$, 6) 0.5-1.8 wt. % of one or more of $Li_2O$, $Na_2O$ and/or $K_2O$, 7) 0.01-1.5 wt. % $TiO_2$, and 8) 0.005-0.75 wt. % $Fe_2O_3$.

In still further embodiments, mineral batch material(s) for the production of mineral wool fibers of the present disclosure may comprise 1) 61-74 wt. % $SiO_2$, such as 63-72 wt. % $SiO_2$, 2) 0-8 wt. % $Al_2O_3$, including 0-6 wt. % $Al_2O_3$, 3) 4-12 wt. % CaO, such as 6-10 wt. % CaO, 4) 0-6 wt. % MgO, including 0-4 wt. % MgO, 5) 0-8 wt. % $B_2O_3$, such as 0-6 wt. % $B_2O_3$, 6) 12-18 wt. % of $Na_2O$ and/or $K_2O$, including 14-16 wt. % of $Na_2O$ and/or $K_2O$, 7) 0-2 wt. % $TiO_2$, such as 0-1 wt. % $TiO_2$, 8) 0-1 wt. % $Fe_{23}$, including 0-0.5 wt. % $Fe_2O_3$, and 9) 0-1 wt. % fluoride ($F^-$), such as 0-0.4 wt. % $F^-$.

In certain embodiments, mineral batch material(s) for the production of mineral wool fibers of the present disclosure may comprise 1) 70-77 wt. % $SiO_2$, including 72-75 wt. % $SiO_2$, 2) 0-2 wt. % $Al_2O_3$, such as 0-1 wt. % $Al_2O_3$, 3) 0-2 wt. % CaO, including 0-1 wt. % CaO, 4) 19-26 wt. % $B_2O_3$, such as 21-24 wt. % $B_2O_3$, 5) 0-6 wt. % of $Na_2O$ and/or $K_2O$, including 0-4 wt. % of $Na_2O$ and/or $K_2O$, and 9) 0-1 wt. % $Fe_2O_3$, such as 0-0.3 wt. % $Fe_2O_3$.

In some embodiments, mineral batch material(s) for the production of mineral wool fibers of the present disclosure may comprise 1) 53-77 wt. % $SiO_2$, including 55-75 wt. % $SiO_2$, 2) 0-7 wt. % $Al_2O_3$, such as 0-5 wt. % $Al_2O_3$, 3) 0-12 wt. % CaO, including 1-10 wt. % CaO, 4) 0-3 wt. % $LiO_2$, such as 0-1.5 wt % $LiO_2$, 5) 0-10 wt. % $B_2O_3$, including 0-8 wt. % $B_2O_3$, 6) 9-23 wt. % of $Na_2O$ and/or $K_2O$, such as 11-21 wt. % of $Na_2O$ and/or $K_2O$, 7) 0-14 wt. % $TiO_2$, including 0-12 wt. % $TiO_2$, 8) 0-20 wt. % $ZrO_2$, such as 1-18 wt. % $ZrO_2$, 9) 0-7 wt. % $Fe_2O_3$, including 0-5 wt. % $Fe_2O_3$, and 10) 0-7 wt. % fluoride, such as 0-5 wt. % fluoride.

In further embodiments, mineral batch material(s) for the production of mineral wool fibers of the present disclosure may comprise 1) 52-62 wt. % $SiO_2$, including 55-60 wt. % $SiO_2$, 2) 21-30 wt. % $Al_2O_3$, such as 23-28 wt. % $Al_2O_3$, 3) 6-17 wt. % CaO, including 8-15 wt. % CaO, 4) 2-9 wt. % MgO, such as 4-7 wt. % MgO, 5) 0-1 wt. % $B_2O_3$, including 0-0.35 wt. % $B_2O_3$, 6) 0-2 wt. % of $Na_2O$ and/or $K_2O$, such as 0-1 wt. % of $Na_2O$ and/or $K_2O$, 7) 0-1 wt. % $Fe_2O_3$, including 0-0.5 wt. % $Fe_2O_3$, and 8) 0-1 wt. % fluoride, such as 0-0.3 wt. % fluoride.

In still further embodiments, mineral batch material(s) for the production of mineral wool fibers of the present disclosure may comprise 1) 62-68 wt. % $SiO_2$, including 64-66 wt. % $SiO_2$, 2) 22-27 wt. % $Al_2O_3$, such as 24-25 wt. % $Al_2O_3$, 3) 8-12 wt. % MgO, including 9.5-10 wt. % MgO, 4) 0-1 wt. % CaO, such as 0-0.2 wt. % CaO, 5) 0-1 wt. % of $Na_2O$ and/or $K_2O$, including 0-0.2 wt. % of $Na_2O$ and/or $K_2O$, and 6) 0-0.5 wt. % $Fe_2O_3$, such as 0-0.1 wt. % $Fe_2O_3$.

In some embodiments, the mineral batch material(s) comprises a composition differing from the composition of the mineral wool fibers produced by the processing of the mineral batch material(s). In certain embodiments, the disclosed mineral batch material(s) may comprise one or more of 1) an $SiO_2$ concentration which is less than that of the as-produced mineral wool fibers, for instance a concentration decrease of at least 5 relative percentage points by weight (5 wt. %); 2) an $Al_2O_3$ concentration which is greater than that of the as-produced mineral wool fibers, for instance a concentration increase of at least 5 relative percentage points by weight (5 wt. %); and 3) an $Na_2O$ and/or $K_2O$ concentration which is less than that of the as-produced mineral wool fibers, for instance a concentration decrease of at least 4 relative percentage points by weight (4 wt. %).

In some embodiments, mineral batch material(s) for the production of mineral wool fibers of the present disclosure may comprise fibers comprising an average diameter of greater than or equal to >5 μm, greater than or equal to 9 μm, greater than or equal to 10 μm and greater than or equal to 12, and/or less than or equal to 25 μm, less than or equal to 20 μm and less than or equal to 18 μm. In further embodiments, fibers for use in the production of the mineral wool fibers disclosed herein have an average length which is greater than or equal to 2 mm, greater than or equal to 5 mm and greater than or equal to 8 mm, and/or less than or equal to 100 mm, less than or equal to 80 mm, less than or equal to 60 mm and less than or equal to 50 mm. In certain embodiments, fibers used in the production of the resulting mineral wool fibers may be produced by crushing, chopping or milling fibers comprising a greater length relative to the resulting mineral wool fibers, for example fibers having a length of greater than or equal to 30 cm and greater than or equal to 50 cm. As would be appreciated by the skilled artisan, the length of fibers used in the production of the resulting mineral wool fibers may be reduced by processing via milling equipment such as a wheel mill and a hammer mill. In still further embodiments, fibers used in the production of the resulting mineral wool fibers are introduced into a to the melter, for example a submerged combustion melter, may comprise an average length of greater than or equal to 2 mm and/or less than or equal to 10 mm. In alternative embodiments, mineral batch material(s) for the production of the disclosed mineral wool fibers may comprise cullet comprising a particle size wherein at least 90 wt. % of the cullet, including at least 95 wt. % of the cullet, comprising a maximum dimension of less than or equal to 20 mm, including less than or equal to 15 mm and less than or equal to 10 mm.

In some embodiments, mineral batch material(s) for the production of the disclosed mineral wool fibers may comprise, consist essentially of, or consist of scrap, such as scrap from the manufacture of mineral fibers and scrap from the manufacture of mineral fibers comprising a different composition from the mineral wool fibers being manufactured. For example, mineral batch material(s) for the production of the disclosed mineral wool fibers may comprise, consist essentially of, or consist of scrap fibers, including nonwoven scrap fibers, produced during the manufacture of continuous fibers. In certain embodiments, mineral batch material(s) for the production of the disclosed mineral wool fibers may comprise, consist essentially of, or consist of fibers which have been broken or otherwise damaged during their initial manufacture, for example at a bushing producing continuous fibers, and/or which are unsuitable for incorporation into their originally intended product. The use of scrap as a batch material, including as a mineral batch material as described herein, may beneficially avoid complex, energy intensive recycling processes and/or the disadvantageous disposal of scrap in landfills.

As used herein, the terms "consist or consist essentially of" and derivatives thereof are used to define the scope of a statement or claim limitation to the specified materials or steps and those that do not materially affect the basic and novel characteristic(s) of the disclosed technology.

In some embodiments, the mineral batch material(s) for the production of the disclosed mineral wool fibers may comprise fiber/scrap fiber comprising one or more of an organic coating, size and binder, for example in the form of an aqueous solution or suspension comprising a starch, an oil, an emulsion, polyvinyl acetate(s), polyester(s), epoxy(s), polyurethane(s), polyvinyl pyrrolidone(s), polyvinyl alcohol(s), silane(s), organosilane(s) and combinations thereof. In certain embodiments, an organic coating, size or binder may be present at a concentration of greater than or equal to 0.5 wt. % and greater than or equal to 1 wt. %, and/or greater than or equal to 10 wt. % and greater than or equal to 8 wt. % with respect to the total weight of the mineral batch material(s).

In some embodiments, the water or moisture content in the first mineral batch material(s) when introduced into a melter for use in the production of the disclosed mineral wool fibers, such as a submerged combustion melter (SCM), may be greater than or equal to 2 wt. %, greater than or equal to 5 wt. % and greater than or equal to 10 wt. %; and/or less than or equal to 35 wt. %, less than or equal to 25 wt. %, less than or equal to 20 wt. % and less than or equal to 15 wt. % based on the total weight of the mineral batch material(s), including 10-25 wt. %. The ability to use mineral batch material(s) comprising high water and/or moisture content, for instance greater than or equal to 10 wt. %, beneficially allows for the use of materials in the absence of any pre-treatment to reduce water content.

In some embodiments, mineral batch material(s) for the production of the disclosed mineral wool fibers may comprise greater than or equal to 5 wt. %, greater than or equal to 10 wt. %, greater than or equal to 15 wt. % and greater than or equal to 20 wt. %, and/or less than or equal to 70 wt. %, less than or equal to 60 wt. %, less than or equal to 50 wt. %, less than or equal to 40 wt. %, less than or equal to 30 wt. % and less than or equal to 25 wt. % of the total batch materials introduced into a melter, such as a submerged combustion melter (SCM). As used herein, the term "batch materials" comprises all materials, including mineral batch material(s), introduced into the melter which provide any of the elements that will form part of the melt excluding a) water (other than water of crystallization); b) organic compounds including but not limited to binders, which will decompose in the melter; and c) fuel and combustion gases. In some embodiments, mineral batch materials comprise at least 10 wt. % of the batch materials, i.e. the total amount of batch materials.

In certain embodiments, the batch materials, i.e. the total batch materials, further comprise a second batch material(s), alternatively referred to as a second mineral batch material(s). The second batch material(s) may comprise mineral wool fibers. Such mineral fibers may comprise 1) 55-75 wt. % $SiO_2$, 2) 5-20 wt. % CaO and/or MgO, 3) 5-20 wt. % $Na_2O$ and/or $K_2O$, 4) 0-5 wt. % $Al_2O_3$, 5) 0-2 wt. % $Fe_2O_3$, and 6) an alkali/alkaline-earth ratio of greater than 1. In further embodiments, the concentration of $SiO_2$ in the second batch material(s) may be greater than or equal to 60 wt. % and greater than or equal to 62 wt. %, and/or less than or equal to 72 wt. % and less than or equal to 70 wt. %. In still further embodiments, the concentration of $Al_2O_3$ in the second batch material(s) may be greater than or equal to 1 wt. % and greater than or equal to 2 wt. %, and/or less than or equal to 7 wt. % and less than or equal to 5 wt. %. In additional embodiments, the total concentration of CaO and/or MgO in the second batch material(s) may be greater than or equal to 11 wt. % and greater than or equal to 13 wt. %, and/or less than or equal to 22 wt. % and less than or equal to 20 wt. %. In certain embodiments, the concentration of $Na_2O$ and/or $K_2O$ in the second batch material(s) may be greater than or equal to 7 wt. % and/or less than or equal to 15 wt. %, less than or equal to 12 wt. % and less than or equal to 10 wt. %. In further embodiments, the concentration of $Fe_2O_3$ in the second batch material(s) may be less than or equal to 1 wt. % and less than or equal to 0.8 wt. %. In still further embodiments, the second batch material comprises recycled and/or recyclable mineral wool fibers, including mineral wool fibers manufactured and/or recycled in the manufacturing processes disclosed herein, such as scrap, off-cuts and/or edge cuts of mineral wool insulation.

In some embodiments, the second batch material(s) may comprise one or more of an organic coating, size and/or binder, for example in the form of an aqueous solution or suspension, comprising phenol formaldehyde, polyester(s), epoxy(s), silane(s), Maillard reactants, Maillard reactant products, organosilane(s) and combinations thereof. In certain embodiments, the organic coating, size and/or binder may be present at a concentration of greater than or equal to 0.5 wt. % and greater than or equal to 0.1 wt. %, and/or less than or equal to 10 wt. % and less than or equal to 8 wt. % with respect to the total weight of the second batch material.

In some embodiments, the second batch material(s) may be processed before being introduced into a melter such as an SCM, for example by crushing, chopping, milling, opening out or combinations thereof. In certain embodiments, the second batch material(s) may be processed together with the first batch material(s). In further embodiments, the second batch material(s) may be introduced into a melter such as an SCM as a component of one or more briquettes, including briquettes comprising one of more of the features described excluding a) the substitution of the second batch material(s) for the first batch material(s) in the briquettes, or b) the substitution of a combination of the first and second batch materials for the first batch material(s) in the briquettes. In still further embodiments, the second batch material(s) may comprise greater than or equal to 5 wt. %, greater than or equal to 10 wt. %, greater than or equal to 15 wt. % and greater than or equal to 20 wt. %, and/or less than or equal to 70 wt. %, less than or equal to 60 wt. %, less than or equal to 50 wt. %, less than or equal to 40 wt. % less than or equal to 30 wt. % and less than or equal to 25 wt. % of the total batch materials introduced into a melter.

In some embodiments, the combination of the first and second batch materials may comprise greater than or equal to 40 wt. %, greater than or equal to 50 wt. %, greater than or equal to 60 wt. % and greater than or equal to 70 wt. %, and/or less than or equal to 90 wt. % and less than or equal to 80 wt. % of the total batch materials introduced into a melter.

In some embodiments, one or more additional batch materials may be included with the first and/or second batch materials selected from the group consisting of silica sand, feldspar, nepheline syenite, aplite, calcined alumina, hydrated alumina, soda-ash, limestone, dolomite, magnesite, recycled glass bottles, recycled glass sheets, borax pentahydrate, borax decahydrate, anhydrous borax and combinations thereof.

In additional embodiments, the melting of mineral batch materials, batch materials and/or additional batch materials may be carried out in a melter selected from the group consisting of a submerged combustion melter, a tank furnace, an electric arc furnace and a circulating furnace.

In embodiments where an electric arc furnace is utilized, the mineral batch materials, batch materials and/or additional batch materials may be directly exposed to an electric arc so that an electrical current from the electrodes in the furnace passes through the batch material(s) to provoke melting.

Embodiments where a circulating furnace is utilized may comprise 1) injecting particulate fuel, particulate mineral batch material(s), batch materials and/or additional batch materials and primary combustion gas into a combustion chamber comprising circulating chamber gases, 2) melting the particulate mineral batch materials to form a mineral melt and generating exhaust gases, and 3) separating the mineral melt from the hot exhaust gases wherein the hot exhaust gases pass through an outlet in the circulating combustion chamber and the mineral melt collects in a base zone.

Embodiments where a submerged combustion melter is utilized may comprise 1) introducing mineral batch material(s) into a melting chamber having one or more submerged combustion burners mounted in its floor and/or wall, 2) melting the batch material(s) by discharging combustion products under a level of material being melted in the melter using submerged combustion burners and creating turbulent conditions in the melt. Submerged combustion melters and related equipment are described, for example, in WIPO Pat. App. Pub. Nos. WO 2015/014921, WO 2015/014919, WO 2015/014920, WO 2016/120351 and WO 2016/120353, each of which is hereby incorporated by reference.

In some embodiments, fiberizing the melt to form mineral wool fibers may be performed using an internal spinner. In related embodiments, the melt is 1) introduced into the interior of an internal spinner rotating about a substantially vertical axis, 2) travels towards the interior surface of a peripheral wall of the spinner, and 3) passes through orifices in the peripheral wall of the spinner to form melt streams, which are attenuated by blast air passing along or adjacent to the external side of the peripheral wall of the spinner to form mineral fibers.

In certain embodiments, the present disclosure provides for a method of manufacturing a mineral fiber thermal insulation product comprising the steps of a) producing mineral wool fibers from a melt as described herein; b) spraying a binder solution, such as an aqueous binder solution, onto the mineral fibers; c) collecting the mineral fibers comprising the binder solution to form a blanket of mineral fibers; and d) curing the binder solution by passing the blanket of mineral fibers through a curing oven.

In some embodiments, the uncured mineral fibers to which the binder solution has been applied (i.e. prior to the curing of the binder solution) may be collected to form a primary blanket of mineral fibers which is subsequently folded over itself, for example using a pendulum mechanism, to produce a secondary blanket comprising superimposed layers of the primary blanket.

In alternative embodiments, wash water may be sprayed onto the mineral fibers between their formation and their collection to form a primary blanket, wherein at least a portion of the wash water sprayed onto the mineral fibers is recycled/returned to a wash water system for reuse. Accordingly, in some embodiments the binder solution may comprise wash water. In further embodiments, the solids content of the binder solution applied to the mineral fibers may be greater than or equal to 10 wt. % and greater than or equal to 12 wt. %, and/or less than or equal to 20 wt. % and less than or equal to 18 wt. %. As used herein, the term "dry weight of the binder solution" refers to the weight of all components of the binder solution excluding water, i.e. liquid water and/or water of crystallization).

In embodiments, the binder solution does not comprise formaldehyde and/or added formaldehyde. In some embodiments, the binder solution may be "substantially formaldehyde free," i.e. the binder solution emits less than 5 parts per million (ppm) formaldehyde following drying and/or curing (or experimentation and/or testing for simulating drying and/or curing). In additional embodiments, the binder solution is "formaldehyde free," i.e. the binder solution emits less than 1 ppm formaldehyde following drying and/or curing (or experimentation and/or testing for simulating drying and/or curing).

In alternative embodiments, the binder solution comprises a phenol formaldehyde binder solution, such as a urea-extended phenol formaldehyde binder solution.

In some embodiments, the binder solution may comprise one or more reducing sugar(s) at concentrations of greater than or equal to 30%, greater than or equal to 40%, greater than or equal to 50%, greater than or equal to 60%, greater than or equal to 70% and greater than or equal to 80% of the dry weight of the binder solution, and/or less than or equal to 97% and less than or equal to 95% of the dry weight of the binder solution. In related embodiments, the reducing sugar reactant(s) may be selected from the group consisting of monosaccharides, monosaccharides in aldose or ketose form, disaccharides, polysaccharides, trioses, tetroses, pentoses, xylose, hexoses, dextrose, fructose, heptose, high fructose corn syrup (HFCS), molasses, starch hydrolysates, cellulose hydrolysates and mixtures thereof. In certain embodiments, the reducing sugar reactant(s) may comprise a dextrose equivalent (DE) of at least about 50, at least about 60, at least about 70, at least about 80 and at least about 90.

In some embodiments, the binder solution may comprise nitrogen-comprising reactant(s) at a concentration of greater than or equal to 2.5%, greater than or equal to 5% and greater than or equal to 10% of the dry weight of the binder solution, and/or less than or equal to 50%, less than or equal to 40%, less than or equal to 30% and less than or equal to 25% of the dry weight of the binder solution. In further embodiments, the nitrogen-comprising reactant(s) may be selected from the group consisting of ammonia ($NH_3$), inorganic amines, organic amines comprising at least one primary amine group and/or salts thereof, inorganic and organic ammonium salts, ammonium sulfate, ammonium phosphate, diammonium phosphate, ammonium citrate, diamines, polyamines, primary polyamines (i.e., organic compounds comprising two or more primary amine groups (—$NH_2$)), 1,6-diaminohexane (hexamethylenediamine, HMDA), 1,5-diamino-2-methylpentane (2-methyl-pentamethylenediamine) and combinations thereof.

In certain embodiments, the binder solution may comprise greater than or equal to 25%, greater than or equal to 40%, greater than or equal to 50% and greater than or equal to 60% by dry weight of a combination of (a) reducing sugar reactant(s) and nitrogen-comprising reactant(s); and/or (b) curable reaction product(s) of reducing sugar reactant(s) and nitrogen-comprising reactant(s). In further embodiments, the nitrogen-comprising reactant(s) and the reducing sugar reactant(s) (and/or their reaction product(s)) may comprise one or more Maillard reactants capable of forming Maillard reaction products, such as melanoidins when cured. In related embodiments, the curing reactions of the binder composition may comprise or consist essentially of Maillard reaction(s). In additional embodiments, the cured binder composition may comprise melanoidin-comprising and/or nitrogenous-comprising polymer(s). The binder composition may comprise a binder composition as described in WIPO Pat. App. Pub. Nos. WO 2007/014236, WO 2009/019232, WO 2009/019235, WO 2011/138458, WO 2011/138459 and WO 2013/150123, each of which is hereby incorporated by reference. The binder composition may include ester and/or polyester compounds. The cured binder may comprise greater than 2% and/or less than 8% nitrogen by mass as determined by elemental analysis.

The curing temperature and time for the preparation of a primary blanket of mineral wool fibers by a curing oven may be manipulated based on product density and/or thickness. In some embodiments, the curing oven may comprise a plurality of heating zones comprising temperatures of 200-350° C., such as 230-300° C. In certain embodiments, a thin, low-density primary blanket, i.e. comprising a density of 12 kg/m$^3$ or less, may be cured by passing the primary blanket through the curing oven in about 20 seconds. In further embodiments, a thick, high-density primary blanket, i.e. comprising a density of 80 kg/m$^3$ or more, may require a passage time of 15 minutes or more in the curing oven. In embodiments, the blanket of mineral wool fibers may reach a temperature of 180-220° C. during the curing process. In certain embodiments, the duration of passage of the blanket through the curing oven may be greater than or equal to 0.5 minutes, greater than or equal to 1 minute, greater than or equal to 2 minutes, greater than or equal to 5 minutes and greater than or equal to 10 minutes, and/or less than or equal to 50 minutes, less than or equal to 40 minutes and less than or equal to 30 minutes.

In some embodiments, the concentration of cured binder in the cured blanket of mineral wool fibers may be greater than or equal to 1 wt. %, greater than or equal to 2 wt. %, greater than or equal to 2.5 wt. %, greater than or equal to 3 wt. %, greater than or equal to 3.5 wt. % and greater than or equal to 4 wt. %, and/or less than or equal to 10 wt. % and less than or equal to 8 wt. % as measured by loss on ignition (LOI).

In certain embodiments, the cured blanket comprising mineral wool fibers may comprise one or more of 1) a density of greater than 5, 10, 15, 20 and 25 kg/m$^3$, and/or of less than 80, 100 and 120 kg/m$^3$; 2) a thermal conductivity (k) as measured in accordance with ISO 8301 at 10° C. of less than or equal to 40 mW/m·K and/or >20 mW/m·K; 3) a concentration of less than 99 wt. % and/or more than 80 wt. % by weight of mineral fibers; 4) a thickness of greater than 10 mm, 15 mm and 20 mm, and/or less than 400 mm, 350 mm and 300 mm; 5) a length of greater than or equal to 90 cm, greater than or equal to 120 cm and greater than or equal to 150 cm, and/or less than or equal to 220 cm and less than or equal to 180 cm; and 6) a width of greater than or equal to 50 cm, greater than or equal to 70 cm, and/or less than or equal to 100 cm and less than or equal to 90 cm.

Examples

As shown in Table 1-4, certain embodiments of the disclosed mineral wool fiber compositions are exemplified in Examples A-F, including i) the composition of a mineral wool fibers that may be produced (Table 1); ii) batch materials/concentrations that may be used to make the glass fiber composition of Examples A-F (Table 2); iii) the composition of the scrap fibers ("Batch Material 1") used for each example (Table 3); and iv) the composition of Batch Materials 2-5 used for each example (Table 4).

TABLE 1

Composition of As-Manufactured Mineral Wool Fibers (wt. %)

| | $SiO_2$ | $Al_2O_3$ | $B_2O_3$ | CaO | MgO | $TiO_2$ | $Fe_2O_3$ | $Na_2O$ | $K_2O$ | $Li_2O$ | F | $ZrO_2$ | BaO | $P_2O_5$ |
|---|---|---|---|---|---|---|---|---|---|---|---|---|---|---|
| Ex. A | 74.27 | 4.94 | 3.97 | 6.19 | 1.22 | 0.18 | 0.23 | 7.58 | 0.89 | 0.14 | 0.28 | | 0.12 | |
| Ex. B | 70.73 | 2.80 | 4.87 | 3.80 | 1.66 | 0.44 | 0.27 | 11.77 | 3.41 | | 0.16 | | 0.09 | |
| Ex. C | 74.21 | 1.62 | 8.39 | 3.58 | 1.47 | 0.03 | 0.19 | 9.18 | 1.23 | | | | 0.09 | 0.01 |
| Ex. D | 67.08 | 2.28 | 5.39 | 4.90 | 1.42 | 1.83 | 0.79 | 12.05 | 2.38 | 0.36 | | 1.44 | 0.09 | 0.01 |
| Ex. E | 67.90 | 4.56 | 5.18 | 3.87 | 2.11 | 0.04 | 0.16 | 15.24 | 0.78 | | 0.02 | | 0.12 | |
| Ex. F | 73.14 | 4.62 | 6.13 | 3.02 | 2.57 | 0.04 | 0.12 | 9.39 | 0.83 | | | | 1.31 | |

TABLE 2

Batch Materials (wt. %)

| | Batch Material 1: Scrap fibers | Batch Material 2: Silica sand | Batch Material 3: Soda ash | Batch Material 4: Borax | Batch Material 5: Dolomite |
|---|---|---|---|---|---|
| Ex. A | 26.53 | 57.47 | 9.73 | 4.42 | 1.86 |
| Ex. B | 37.59 | 42.96 | 11.82 | 5.37 | 2.26 |
| Ex. C | 33.71 | 44.94 | 12.36 | 1.12 | 7.87 |
| Ex. D | 32.26 | 43.01 | 11.83 | 5.38 | 7.53 |
| Ex. E | 10.19 | 55.56 | 18.52 | 9.26 | 6.48 |
| Ex. F | 11.22 | 61.22 | 10.20 | 10.20 | 7.14 |

The concentration of Batch Material 1 ("Scrap fibers") in Table 2 is the concentration of the mineral portion of the fibers following the removal of organic binder by decomposition.

TABLE 3

Composition of Batch Material 1 (Scrap fibers; wt. %)

| | $SiO_2$ | $Al_2O_3$ | $B_2O_3$ | CaO | MgO | $TiO_2$ | $Fe_2O_3$ | $Na_2O$ | $K_2O$ | $Li_2O$ | F | $ZrO_2$ |
|---|---|---|---|---|---|---|---|---|---|---|---|---|
| Ex. A | 56.0 | 12.0 | 6.0 | 19.0 | 3.0 | 0.5 | 0.5 | 1.0 | 0.5 | 0.5 | 1.0 | |
| Ex. B | 65.0 | 4.0 | 5.1 | 7.0 | 3.0 | 1.0 | 0.5 | 7.0 | 7.0 | | 0.4 | |
| Ex. C | 73.0 | 1.0 | 21.0 | 1.0 | | | 0.3 | 2 | 1.7 | | | |
| Ex. D | 60.0 | 3.0 | 7.0 | 5.0 | | 5.0 | 2.0 | 8.0 | 5.0 | 1.0 | | 4.0 |
| Ex. E | 57.0 | 25.0 | 0.3 | 9.0 | 7.0 | | 0.5 | 1.0 | | | 0.2 | |
| Ex. F | 62.0 | 23.0 | 5.0 | 0.2 | 9.5 | | 0.1 | 0.2 | | | | |

TABLE 4

Composition of Batch Materials 2-5 (wt. %)

| | $SiO_2$ | $Al_2O_3$ | $B_2O_3$ | CaO | MgO | $TiO_2$ | $Fe_2O_3$ | $Na_2O$ | $K_2O$ | $Li_2O$ | F | BaO | $P_2O_5$ | Loss |
|---|---|---|---|---|---|---|---|---|---|---|---|---|---|---|
| Batch Material 2: Silica sand | 95.08 | 2.51 | | 0.13 | 0.06 | 0.06 | 0.15 | 0.21 | | 1.21 | | 0.19 | | 0.40 |
| Batch Material 3: Soda ash | | | | | | | | 59.23 | | | | | | 40.77 |
| Batch Material 4: Borax | | | 48 | | | | | 21.28 | | | | | | 30.72 |
| Batch Material 5: Dolomite | 0.02 | 0.01 | | 36.27 | 16.65 | 0.01 | 0.03 | 0.07 | | 0.01 | | | 0.06 | 43.51 |

The concentrations disclosed in Table 4 represent fully calcined materials, where the weight loss is believed to be due in part to the decarboxylation of calcinates and the loss of water of crystallization.

In accordance with Tables 1-4, the first batch material may comprise a significantly different composition as compared to the melt and/or mineral fibers produced.

The invention claimed is:

1. A method of making mineral wool fibers comprising:
55 to 75 wt % $SiO_2$, and
5 to 20 wt % of the combination of CaO and MgO, and
5 to 20 wt % of the combination of $Na_2O$ and $K_2O$, and
0 to 5 wt % $Al_2O_3$, and
up to 2 wt % total iron expressed as $Fe_2O_3$, and
an alkali/alkaline-earth ratio expressed in terms of wt % of alkali metal oxides/wt % of alkaline-earth metal oxides which is >1,
the method comprising:
introducing mineral batch materials in to a melter, the mineral batch materials comprising a first batch material and a second batch material, and melting the mineral batch materials to provide a melt and fiberizing the melt to form the mineral wool fibers,
wherein
the first batch material consists essentially of scrap from the manufacture of mineral fibers and which comprises:
52 to 62 wt % $SiO_2$, and
12 to 16 wt % $Al_2O_3$, and
16 to 25 wt % CaO, and
0 to 5 wt % MgO, and
4 to 10 wt % $B_2O_3$, and
0 to 2 wt % of the combination of $Li_2O+Na_2O+K_2O$, and
0 to 1.5 wt % $TiO_2$, and
0.005 to 1 wt % total iron expressed as $Fe_2O_3$, and
0 to 1 wt % fluoride.

2. The method of claim 1, wherein the melter is a submerged combustion melter.

3. The method of claim 1, wherein the mineral batch materials comprise further batch materials selected from: soda-ash, limestone, dolomite, magnesite, recycled glass bottles, recycled glass sheets and borax.

4. The method of claim 1, further comprising using the mineral wool fibers to make a mineral wool insulation product and comprising:
spraying an aqueous binder solution to coat the mineral wool fibers whilst the mineral wool fibers are being carried in an air stream;
collecting the binder coated mineral wool fibers to form a blanket of mineral fibers; and
curing the aqueous binder solution by passing the blanket of mineral wool fibers through a curing oven.

5. The method of claim 4, wherein the batch materials comprise recycled portions of the mineral wool insulation product.

6. The method of claim 1, wherein the melter is a tank furnace.

7. The method of claim 1, wherein the melter is an electric arc furnace.

8. The method of claim 1, wherein the melter is a circulating furnace.

9. The method of claim 1, wherein the first batch material comprises fibers selected from loose fibers and fibers derived from the manufacture of continuous fibers.

10. The method of claim 9, wherein the moisture content of the first batch material when introduced in to the melter is at least 10 wt %.

11. The method of claim 1, wherein the first batch material comprises:
52 to 56 wt % $SiO_2$, and
5 to 10 wt % $B_2O_3$.

12. The method of claim 1, wherein the first batch material constitutes between 10 to 60 wt % of the mineral batch materials.

13. The method of claim 1, wherein the first batch material comprises fibers.

14. The method of claim 13, wherein the fibers comprise an organic coating, present in a quantity of at least 2 wt % with respect to the total weight of the first batch material.

15. The method of claim 1, wherein the second batch material comprises fibers comprising:
55 to 75 wt % $SiO_2$, and
5 to 20 wt % of the combination of CaO and MgO, and
5 to 20 wt % of the combination of $Na_2O$ and $K_2O$, and
0 to 5 wt % $Al_2O_3$, and
0 to 2 wt % total iron expressed as $Fe_2O_3$, and
an alkali/alkaline-earth ratio expressed in terms of wt % of alkali metal oxides/wt % of alkaline-earth metal oxides which is >1.

16. A method of making mineral wool fibers comprising:
55 to 75 wt % $SiO_2$, and
5 to 20 wt % of the combination of CaO and MgO, and
5 to 20 wt % of the combination of $Na_2O$ and $K_2O$, and
0 to 5 wt % $Al_2O_3$, and
up to 2 wt % total iron expressed as $Fe_2O_3$, and
an alkali/alkaline-earth ratio expressed in terms of wt % of alkali metal oxides/wt % of alkaline-earth metal oxides which is >1,
the method comprising:
introducing mineral batch materials in to a submerged combustion melter, melting the mineral batch materials in the submerged combustion melter to provide a melt and fiberizing the melt to form the mineral wool fibers, wherein the mineral batch materials introduced in to the melter comprise a first batch material and wherein:
a) the first batch material comprises:
52 to 62 wt % $SiO_2$, and
12 to 16 wt % $Al_2O_3$, and
16 to 25 wt % CaO, and
0 to 5 wt % MgO, and
4 to 10 wt % $B_2O_3$, and
0 to 2 wt % of the combination of $Li_2O+Na_2O+K_2O$, and
0 to 1.5 wt % $TiO_2$, and
0.05 to 1 wt % total iron expressed as $Fe_2O_3$, and
0 to 1 wt % fluoride; and
b) the first batch material comprises loose fibers derived from the manufacture of continuous fibers; and
c) the moisture content of the first batch material when introduced in to the submerged combustion melter is at least 10 wt %.

* * * * *